United States Patent [19]
Parker et al.

[11] Patent Number: 5,690,194
[45] Date of Patent: Nov. 25, 1997

[54] ONE-WAY PIVOTING GEAR DAMPER

[75] Inventors: Eric G. Parker, Elgin; Steven L. Bivens, Kankakee, both of Ill.

[73] Assignee: Illinois Tool Works Inc., Glenview, Ill.

[21] Appl. No.: 550,380

[22] Filed: Oct. 30, 1995

[51] Int. Cl.[6] .............................. E05F 1/10; F16D 57/00
[52] U.S. Cl. ..................................... 188/82.1; 16/64
[58] Field of Search ............................ 188/290, 82.1, 188/82.8; 192/82 P, 20; 84/422, 411.5; 16/82, 84, 66, 64, 69, 353

[56] References Cited

U.S. PATENT DOCUMENTS

| | | | |
|---|---|---|---|
| 1,526,395 | 2/1925 | Swanson | 16/64 |
| 2,664,183 | 12/1953 | Payne | 188/82.1 |
| 4,691,811 | 9/1987 | Arakana et al. | 188/290 |
| 4,872,239 | 10/1989 | Ferguson et al. | 16/64 |

Primary Examiner—Matthew C. Graham
Attorney, Agent, or Firm—Schwartz & Weinrieb

[57] ABSTRACT

A pivoting gear damper for use with a rotary damper includes a toothed gear rack movable between a first position and a second position corresponding to movements in first and second directions. A pivotal bracket is provided for rotation between first and second positions corresponding to movements of the gear rack in the first and second directions. The rotary damper has a toothed driven gear disposed on the pivotal bracket. One-way dampening means is disposed on the pivotal bracket for causing the toothed gear rack to be in meshed engagement with the toothed driven gear to produce a dampening force when the gear rack is moved in the first direction and for causing the toothed gear rack to be disengaged from the toothed driven gear to allow unrestricted motion when the gear rack is moved in the second direction. The one-way dampening means is comprised of a guide pin and a cam member.

20 Claims, 1 Drawing Sheet

U.S. Patent  Nov. 25, 1997  5,690,194
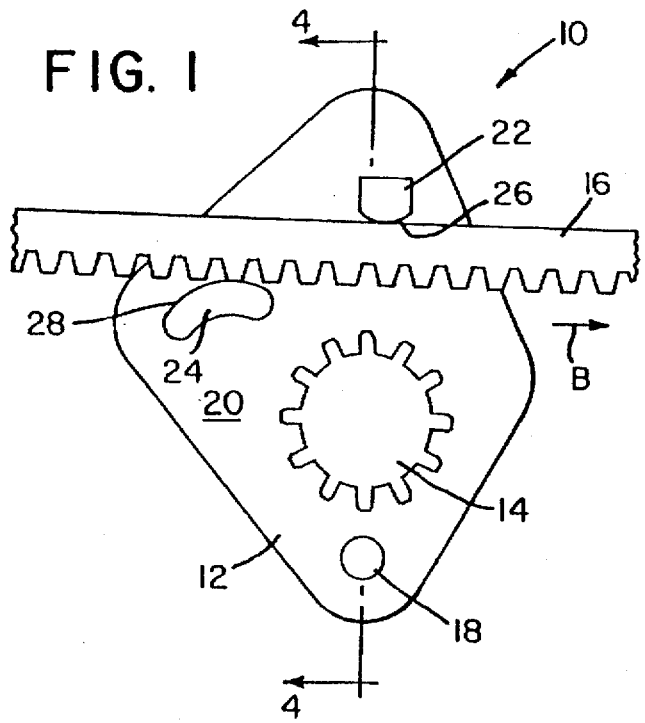
FIG. 1
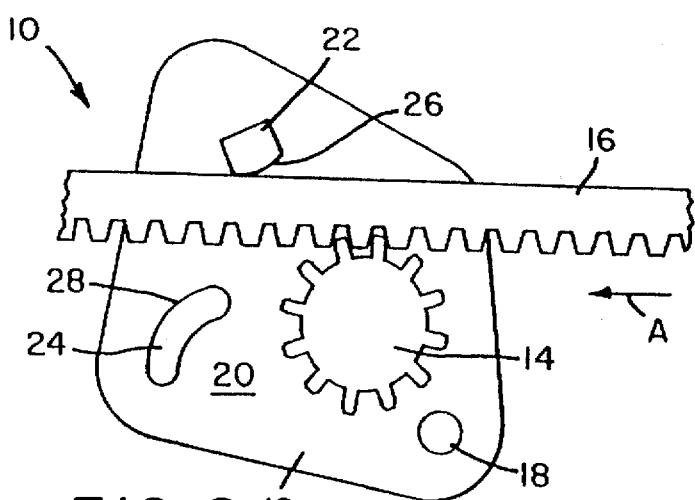
FIG. 2
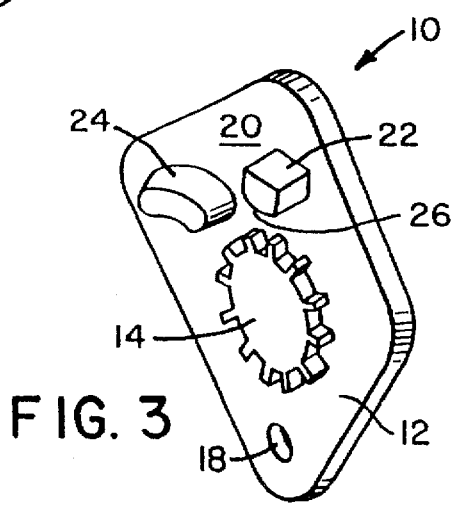
FIG. 3
FIG. 4

ONE-WAY PIVOTING GEAR DAMPER

FIELD OF THE INVENTION

This invention relates generally to rotary oil-type or friction-type damper devices for dampening the opening of an openable object such as an ashtray cupholder, glove compartment door, or the like relative to a main body. More particularly, the present invention relates to a pivoting gear damper of a unique construction which includes means for causing an openable object such as a glove compartment door to be gently or smoothly opened at a dampened or controlled rate of speed when activated and to be closed at an undampened rate of speed.

BACKGROUND OF THE INVENTION

It is generally known in the art that damper devices can be incorporated as a mechanism for controlling the opening and closing of doors and drawers in order to absorb the shock imparted by an external force. For example, when the openable object is a glove compartment door installed in the dashboard of an automotive vehicle the sudden impact attendant opening may cause the contents therein to be tossed or scattered all over the passenger, seat and floor of the vehicle. In order to avoid this type of problem, there has been provided in the prior art different types of damper devices for absorbing the impact created between the main body and the openable object.

One type of prior art damper used for dampening glove compartment doors is a rotary oil-type damper. This prior art rotary damper typically includes a stationary housing and a rotor having a pivoted wheel gear. The pivoted wheel gear is generally adapted for meshed engagement with a gear rack fixed to a portion of the openable object, that is, the glove compartment door. The stationary housing is adapted to be attached to the main body, that is, the stationary glove compartment housing. In operation, the rotary damper is normally statically fixed to a panel with the gear on the damper being held against the mating gear rack. As a result, these prior art dampers suffer from the problem of ratcheting or gear skipping where the gear rack separates away from the gear of the damper. Further, these rotary dampers dampen in both directions and occupy a relatively large amount of space.

Another type of prior art damper device is a linear air damper which is a one-way damper but has the drawback of being formed of a large number of components and also requiring a large amount of space. Thus, they have a restricted use due to the space restraints.

It would therefore be desirable to provide a pivoting gear damper of a unique construction which includes one-way dampening means for causing an openable object to be opened at a dampened rate in a first direction and to be closed at an undampened rate in a second direction. This one-way dampening means is achieved by a guide pin, a cam member, and a bracket having a pivot point so as to cause interengagement between a damper gear and a gear rack in the first direction and to cause disengagement between the damper gear and the gear rack in the second direction. The one-way pivoting gear damper of the present invention represents a significant improvement over the prior art rotary dampening devices.

OBJECTS OF THE INVENTION

Accordingly, it is a general object of the present invention to provide a pivoting gear damper having one-way damp-ening means which is relatively simple and economical to manufacture and assemble, but yet overcomes the disadvantages of the prior art rotary dampening devices.

It is an object of the present invention to provide an improved gear damper which includes one-way dampening means for causing an openable object to be opened at a dampened rate in a first direction and to be closed at an undampened rate in a second direction.

It is another object of the present invention to provide an improved pivoting gear damper which includes one-way dampening means formed of a guide pin, a cam part, and a bracket having a pivot point so as to cause engagement between a damper gear and a gear rack in a first direction and to cause disengagement between the damper gear and the gear rack in a second direction.

It is still another object of the present invention to provide an improved pivoting gear damper which is more compact than those traditionally available, thereby eliminating space constraints encountered by the prior art dampening devices.

It is still yet another object of the present invention to provide an improved pivoting gear damper which includes a gear rack that is self-aligning with the toothed driven gear of the rotary damper, thus eliminating any ratcheting and gear skipping problems.

SUMMARY OF THE INVENTION

In accordance with these aims and objectives, there is provided in a preferred embodiment of the present invention an improved one-way pivoting gear damper for use with a rotary damper which includes a toothed gear rack movable in first and second directions. A pivotal bracket is provided for pivoting between positions corresponding to the movement of the gear rack in the first and second directions. The rotary damper has a toothed driven gear disposed on the pivotal bracket. One-way dampening means is disposed on the pivotal bracket for causing the toothed gear rack to be in meshed engagement with the toothed driven gear to produce a dampening force when the gear rack is moved in the first direction and for causing the toothed gear rack to be disengaged from the toothed driven gear to allow unrestricted motion when the gear rack is moved in the second direction.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout the several views, wherein:

FIG. 1 is a side elevational view of the pivoting gear damper of the present invention, illustrating the movement of the gear rack in a left-to-right direction;

FIG. 2 is a side elevational view similar to FIG. 1, but illustrating the movement of the gear rack in a right-to-left direction;

FIG. 3 is a perspective view of the pivoting gear damper with the gear rack removed; and FIG. 4 is a cross-sectional view, taken along the lines 4—4 of FIG. 1.

DESCRIPTION OF THE PREFERRED EMBODIMENT

Referring now in detail to the drawings, there is shown in FIGS. 1 and 2 a one-way pivoting gear damper 10 constructed in accordance with the principles of the present invention. The gear damper 10 includes one-way pivoting means for causing an openable object such as a glove compartment door to be gently or smoothly opened at a dampened or controlled rate of speed in a first direction and to be closed at an undampened rate of speed in a second direction.

The gear damper 10 is comprised of a pivotable bracket 12 or support means having a toothed driven gear 14 of a rotary damper mounted thereon and a gear rack 16. When the openable object is a glove compartment door, one end of the gear rack 16 is fixedly attached to a wall of the glove compartment door. The pivotal bracket 12 is pivotally attached at a pivot point or aperture 18 to a stationary wall on the side of the glove compartment which is mounted in a dashboard of an automotive vehicle (not shown). It should be understood to those skilled in the art that the gear rack 16 may be alternatively mounted to the stationary wall of the glove compartment while the bracket 12 is mounted to the wall of the glove compartment door.

The pivotal bracket 12 of the present invention is molded from a plastic or other suitable material and has a generally quadrilateral configuration. The pivotal bracket 12 includes a top flat surface 20 which has attached thereto the toothed driven gear 14. Also, there is provided on the top surface 20 the pivot aperture 18, a guide pin 22, and a cam member 24. While the gear rack 16 is shown to be substantially straight, it should be understood to those skilled in the art that the gear rack 16 can be formed of a flexible material so as to be wound and unwound in a spiral configuration, thereby occupying a smaller amount of space. Thus, the gear rack 16 is preferably formed of a relatively soft plastic material or the like.

It should be noted that the construction of the rotary damper does not form any part of the present invention and may be formed of a conventional nature similar to the type shown in U.S. Pat. No. 4,691,811 to Arakawa et al. issued on Sep. 8, 1987, which is hereby incorporated by reference in its entirety. The present invention merely utilizes and cooperates with the toothed driven gear of the rotary damper such as disclosed in the '811 patent.

As can best be seen from FIGS. 3 and 4, the guide pin 22 is formed integrally with and protrudes from the top surface 20 of the pivotal bracket 12. Further, the guide pin 22 is of a generally rectangular construction and includes an arcuate bottom surface 26. The cam member 24 has an arcuate-shaped configuration and includes a top convex surface 28. The cam member 24 is also formed integrally with and protrudes from the top surface 20 of the pivotal bracket 12. It can be seen that the guide pin 22 is provided adjacent the upper end of the bracket 12 and that the pivot aperture 18 is formed adjacent the opposite lower end of the bracket 12. Further, the cam member 24 is formed adjacent the left side of the bracket 12. It will be noted that the gear rack 16 has been purposely omitted from FIG. 3 for the sake of clarity.

The operation of the pivoting gear damper 10 will now be explained in detail with reference to FIGS. 1 and 2. As shown in FIG. 2, it is assumed that the glove compartment door is attached to the distal left end of the gear rack 16 and is in the closed position. When the glove compartment door is activated or opened, this movement causes the gear rack 16 to be moved from right to left in the first direction of arrow A. As a result, the pivotal bracket 12 will be rotated counter-clockwise about the pivot point 18 so as to cause the guide pin 22 to rotate downwardly. The arcuate bottom surface 26 of the guide pin 22 will force the toothed side of the gear rack 16 to be in meshed engagement with the toothed driven gear 14. Consequently, upon opening of the glove compartment door a braking force will be applied as the toothed gear 14 rolls smoothly on the gear rack 16 so as to open the door gently at a dampened or controlled rate of speed.

As shown in FIG. 1, it is assumed that the glove compartment door is attached again to the distal left end of the gear rack 16 and is in the opened position. When the glove compartment door is closed, this causes the gear rack 16 to be moved from left to right in the second direction of arrow B. As a result, the pivotal bracket 12 will be rotated clockwise about the pivot point 18 so as to cause the cam member 24 to rotate upwardly. The top convex surface 28 of the cam member 24 will force the toothed side of the gear rack 16 to be disengaged from the toothed driven gear 14. More specifically, the gear rack 16 will become sandwiched between the arcuate bottom surface 26 of the guide pin 22 and the top convex surface 28 of the cam member 24 so as to maintain the toothed side of the gear rack 16 disengaged from the driven gear 14. Consequently, upon closing of the glove compartment door, no braking force will be applied since the gear rack 16 has been disengaged from the toothed gear 14 so as to close the same at an undampened rate of speed or with an unrestricted motion.

Accordingly, the pivotal bracket 12 having the pivot point 18, the guide pin 22, and the cam member 24 function together as a one-way dampening means and co-operate with the gear rack 16 so as to cause the glove compartment door to be opened at a dampened rate in the first direction and to be closed at an undampened rate in the second direction. The pivoting gear damper of the present invention is more compact than those which are traditionally available, thereby eliminating space constraints encountered by the prior art dampening devices. Further, the gear rack 16 is self-aligned with the toothed driven gear 14 of the damper, thus eliminating any ratcheting and gear skipping problems.

From the foregoing detailed description, it can thus be seen that the present invention provides an improved pivoting gear damper which includes one-way dampening means for causing a toothed gear rack 16 to be in meshed engagement with a toothed driven gear 14 to produce a dampening force in a first direction and for causing the toothed gear rack 16 to be disengaged from the toothed driven gear 14 to allow unrestricted motion in a second direction.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A one-way pivoting gear damper for use with a rotary damper, comprising in combination:

toothed gear means movable between first and second positions and in first and second directions;

pivotable bracket means for pivoting between first and second positions and in first and second directions in accordance with the movement of said toothed gear means;

a toothed driven gear of a rotary damper rotatably disposed upon said pivotable bracket means; and means disposed upon said pivotable bracket means for causing said toothed gear means to be moved into enmeshed engagement with said toothed driven gear so as to permit a dampening force to be produced upon said toothed gear means by the rotary damper and said toothed driven gear when said toothed gear means is moved in said first direction toward said first position, and for causing said toothed gear means to be moved out of engagement from said toothed driven gear so as to allow unrestricted movement of said toothed gear means in said second direction toward said second position.

2. A one-way pivoting gear damper as claimed in claim 1, wherein:

said means disposed upon said pivotable bracket means for causing said movements of said toothed gear means comprises a guide pin and a cam member.

3. A one-way pivoting gear damper as claimed in claim 2, wherein said guide pin has a generally rectangular configuration.

4. A one-way pivoting gear damper as claimed in claim 3, wherein said cam member has a generally arcuate-shaped configuration.

5. A one-way pivoting gear damper as claimed in claim 4, wherein said guide pin has an arcuate bottom surface.

6. A one-way pivoting gear damper as claimed in claim 5, wherein said cam member has a top convex surface.

7. A one-way pivoting gear damper as claimed in claim 6, wherein:

said pivotable bracket means includes a pivot aperture for receiving a mounting fastener.

8. A one-way pivoting gear damper as claimed in claim 1, wherein said pivotal bracket means is molded from a plastic material.

9. A one-way pivoting gear damper as claimed in claim 1, wherein said toothed gear means is made of a soft plastic material.

10. A one-way pivoting gear damper as claimed in claim 1, wherein said pivotable bracket means has a generally quadrilateral configuration.

11. A one-way pivoting gear damper as set forth in claim 1, wherein:

said toothed gear means comprises a gear rack.

12. A one-way pivoting gear damper for use with a rotary damper, comprising in combination:

toothed gear means movable between first and second positions and in first and second directions;

pivotable bracket means for pivoting between first and second positions and in first and second directions in accordance with the movement of said toothed gear means;

a toothed driven gear of a rotary damper rotatably disposed upon said pivotable bracket means; and means disposed upon said pivotable bracket means for engaging said toothed gear means and thereby causing said toothed gear means to be moved into enmeshed engagement with said toothed driven gear so as to permit a dampening force to be produced upon said toothed gear means by the rotary damper and said toothed driven gear when said toothed gear means is moved in said first direction toward said first position, and for causing said toothed gear means to be moved out of engagement from said toothed driven gear so as to allow unrestricted movement of said toothed gear means in said second direction toward said second position.

13. A one-way pivoting gear damper as set forth in claim 12, wherein:

said means disposed upon said pivotable bracket means for causing said movements of said toothed gear means comprises a guide pin and a cam member.

14. A one-way pivoting gear damper as set forth in claim 13, wherein:

said guide pin and said cam member are disposed upon opposite sides of said toothed gear means so as to engage opposite side surfaces of said toothed gear means.

15. A one-way pivoting gear damper as set forth in claim 12, wherein:

said toothed gear means comprises a gear rack.

16. A one-way pivoting gear damper as set forth in claim 12, wherein:

said toothed gear means and said pivotable bracket means are fabricated from a plastic material.

17. A one-way pivoting gear damper for use with a rotary damper, comprising in combination:

toothed gear means movable between first and second positions and in first and second directions;

pivotable bracket means for pivoting between first and second positions and in first and second directions in accordance with the movement of said toothed gear means;

a toothed driven gear of a rotary damper rotatably disposed upon said pivotable bracket means; and means disposed upon said pivotable bracket means for causing said toothed gear means to be moved into direct enmeshed engagement with said toothed driven gear so as to permit a dampening force to be produced upon said toothed gear means by the rotary damper and said toothed driven gear when said toothed gear means is moved in said first direction toward said first position, and for causing said toothed gear means to be moved out of engagement from said toothed driven gear so as to allow unrestricted movement of said toothed gear means when said toothed gear means is moved in said second direction toward said second position.

18. A one-way pivoting gear damper as set forth in claim 17, wherein:

said means disposed upon said pivotable bracket means for causing said movements of said toothed gear means comprises a guide pin and a cam member.

19. A one-way pivoting gear damper as set forth in claim 18, wherein:

said guide pin and said cam member are disposed upon opposite sides of said toothed gear means so as to engage opposite side surfaces of said toothed gear means.

20. A one-way pivoting gear damper as set forth in claim 17, wherein;

said toothed gear means comprises a gear rack.

* * * * *